July 10, 1956     R. G. PIETY     2,754,000
MAGNETIC SEPARATOR

Filed May 6, 1954     2 Sheets-Sheet 1

INVENTOR.
R. G. PIETY
BY *Hudson and Young*
ATTORNEYS

United States Patent Office 2,754,000
Patented July 10, 1956

2,754,000

MAGNETIC SEPARATOR

Raymond G. Piety, Bartlesville, Okla., assignor to Phillips Petroleum Company, a corporation of Delaware Application May 6, 1954, Serial No. 427,903

6 Claims. (Cl. 210—1.5)

This invention relates to a magnetic separator. In a further aspect this invention relates to a magnetic separator in which a cylinder rotates within a magnetic field. In a further aspect this invention relates to a magnetic separator in which a grooved magnetic cylinder rotates between magnetic poles, said magnetic poles enclosing a considerable portion of the outer circle face of said cylinder. In a further aspect this invention relates to a magnetic separator particularly suitable for the removal of finely divided magnetizable particles from lyophilic colloids.

Hydrogenated polymers of conjugated dienes have found wide use in the production of materials such as insulation, protective coatings, etc. which are resistant to low temperatures, safety glass innerliners, plastics, and many other applications. Such hydrogenated polymers are generally prepared by hydrogenating the polymers in a suitable solvent. Representative polymers are prepared from conjugated dienes such as butadiene, isoprene, and methyl pentadiene, and copolymers of these dienes with copolymerizable monomers containing an active $CH_2=C<$ group such as styrene, acrylonitrile, methyl acrylate, methyl vinyl ether, etc. Aromatic hydrocarbons such as benzene, toluene, and the xylenes, are suitable as solvents as well as aliphatic hydrocarbons such as methylcyclohexane. One catalyst which has been widely used for this process is nickel on kieselguhr. In such operation, removal of the catalyst is very difficult since normal filtering processes, including filter paper and commercial pressure filters, have failed to operate satisfactorily. This is due to the fact that these solutions form lyophilic colloids, i. e., a solution in which the colloid has a very high affinity for the solvent. This viscosity is very high even when high dilution ratios are used.

Each of the following objects are obtained by at least one of the aspects of this invention.

An object of this invention is to provide a magnetic separator.

A further object of this invention is to provide apparatus suitable for the removal of finely divided magnetizable material from lyophilic colloids such as hydrogenated polymers of conjugated dienes.

A further object of this invention is to provide a method for removing magnetizable particles from a liquid.

Other objects and advantages of this invention will be apparent to one skilled in the art upon reading this disclosure.

Figure 1:
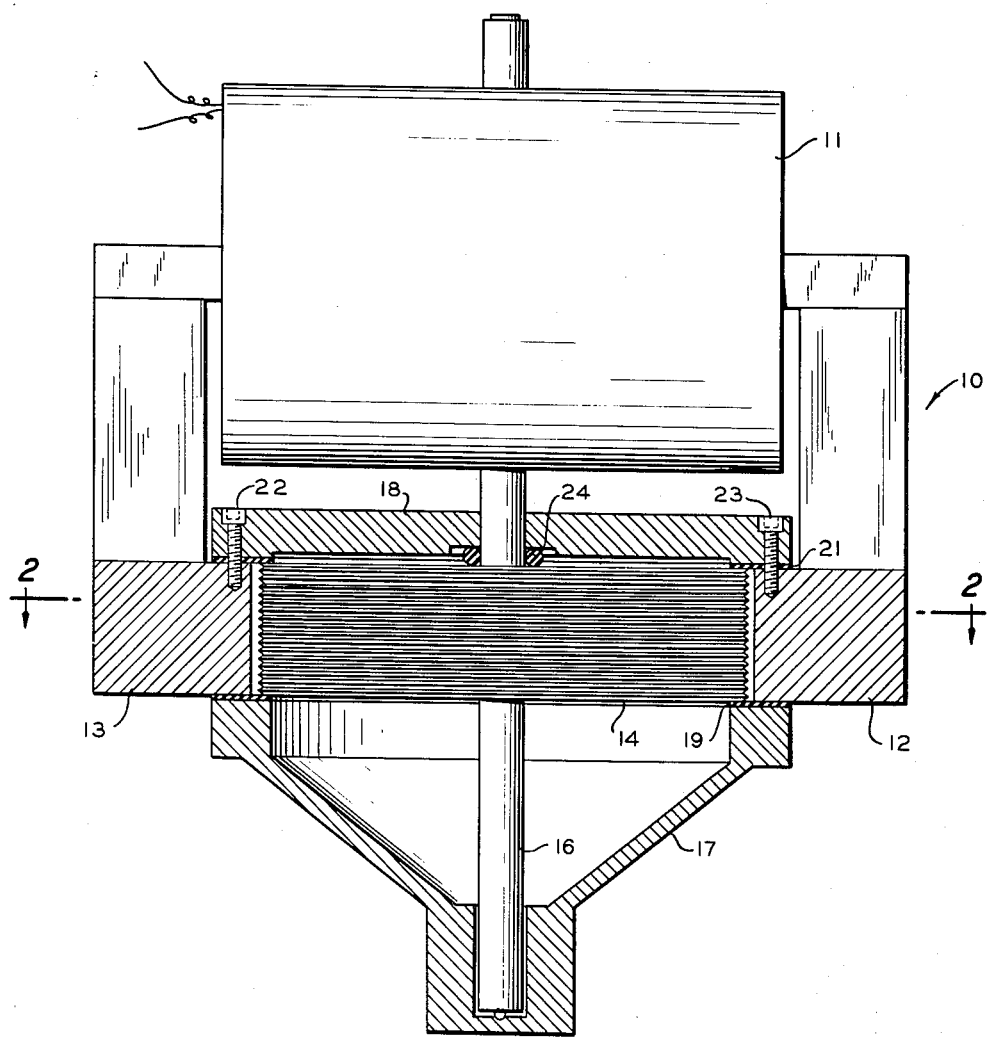
Figure 2:
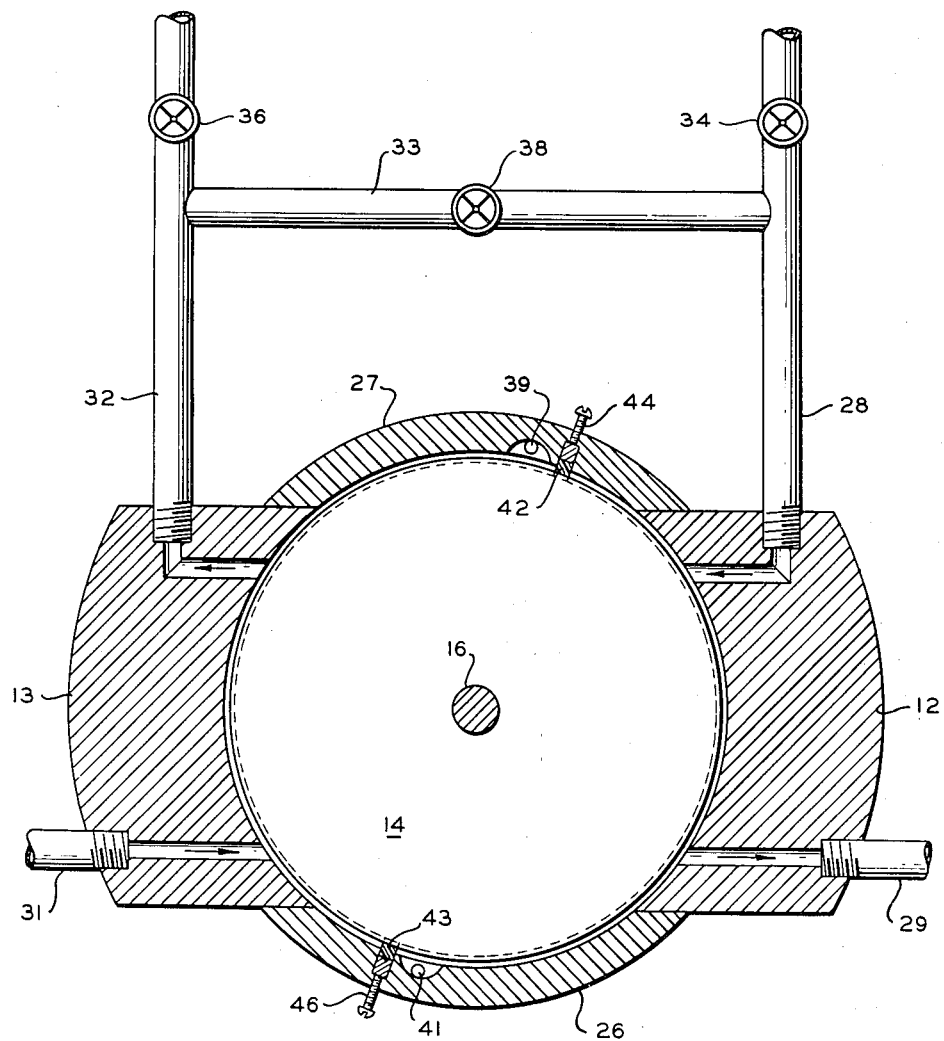

In order that this invention may be fully understood, reference is made to the accompanying drawing in which:

Figure 1 is a cross section view, partly in section, of the apparatus of this invention, and Figure 2 is a sectional view of this apparatus at the level 2—2 of Figure 1.

Broadly speaking, this separator comprises a rotatable cylinder rotating between the pole faces of a magnet. A point on this cylinder passes one pole face and then passes out of the magnetic field and repeats this sequence in connection with the second pole face. The solution containing the magnetizable material is introduced near one side of a pole face, passes past at least the major portion of this pole face and is removed near the second edge of the same pole face. Magnetizable material in this liquid is attracted to and held by the rotatable cylinder and is carried to a point beyond the second edge of the pole face. After passing beyond the edge of this pole face, magnetizable material is removed from the cylinder and discharged from the apparatus.

In Figure 1, the magnet is generally designated as 10, this magnet having electrical winding 11 mounted thereon and being provided with poles 12 and 13. Cylinder 14, mounted upon shaft 16, rotates between poles 12 and 13. This shaft, which extends through a hole in coil 11 and the cross bar of the magnet, is driven by suitable means (not shown). Housing members 17 and 18 are mounted upon either side of rotating disk 14, the housing being made of non-magnetizable material. Washers 19 and 21 form a fluid-tight seal between cylinder 14, housing members 17 and 18, and the poles 12 and 13 of magnet 10. A plurality of bolts such as 22 and 23 provide for adjustment of these members so that the desired fluid-tight seal may be maintained. Washer 21 is provided to aid in maintaining alignment of the various components.

In Figure 2, a view taken on line 2—2 of Figure 1, the flow passages are most clearly shown. The reference numerals in this view correspond to those in Figure 1. In this view, it can be seen that poles 12 and 13 encompass a considerable portion of the outer circular surface of cylinder 14. In order to provide the most efficient operation each pole face should extend around the outer surface of the rotatable cylinder for a distance defined by an arc of 45° to 135°. The balance of the outer surface of cylinder 14 is enclosed by walls 26 and 27 of housing member 17. Pole 12 is provided with inlet conduit 28 and outlet conduit 29. Pole 13 is provided with inlet conduit 31 and outlet conduit 32. Conduit 33 connects conduits 28 and 32. Valves 34, 36 and 38 are provided in conduits 28, 32 and 33.

In the walls 26 and 27 extending between the magnetic poles, outlet conduits 39 and 41 are provided. Immediately down-stream, in the direction of rotation, clockwise in Figure 2, scrapers 42 and 43 are provided, these being adjustable by means of set screws 44 and 46.

In the preferred modification, the cylinder 14 is provided with a grooved face, a series of pointed projections being defined by these grooves. The grooves should be as close together as is convenient for machining and should be spaced in a range of 30 to 60 grooves per inch, preferably about 50 grooves per inch. Furthermore, the angle formed by the sides of these grooves should preferably be 75 to 100 degrees, preferably about 90 degrees. These limits define grooves which provide the most satisfactory operation since the points between grooves can be made very sharp. With grooves, lines of force from the pole face tend to concentrate on the upstanding points giving large force per unit area at said points. This provides the quickest and most effective operation.

Also, in order to provide a strong force upon the particles being removed from the solution it is desirable that the space between the disk and the pole faces be made quite small. A preferred range for this free space is from 0.025 to 0.050 inch.

The operation of this apparatus can best be understood from an examination of Figure 2. In this operation, a liquid, from which it is desired to remove magnetizable material can be introduced through conduit 31 into the free space between pole 13 and cylinder 14, cylinder 14 rotating in a clockwise direction. Magnetizable particles contained in this feed are attracted to and held by cylinder 14 and the solution, from which the magnetizable particles have been removed, is then removed by means of conduit 32. The operation is the same on the other side of the apparatus, feed entering through conduit 28 and being removed through conduit 29. If valve 38 is closed and valves 36 and 34 are open two separate streams can be treated at the same time. Alternatively, when valve 38 is open and valves 36 and 34 are closed, the feed stream is subjected to two separation operations in the same apparatus. With solutions from which removal is difficult such double treatment is often necessary. In fact, it is sometimes necessary to provide more than two distinct separation operations. In such a case two or more units of the apparatus of this invention can be operated in series.

Magnetic particles attracted to cylinder 14 continue to rotate thereon until they reach outlet 39 or 41, a stream of material being removed through each of these outlets. Scrapers 44 and 43 aid in the removal of the magnetizable material from cylinder 14. A small portion of the liquid material is also removed through conduits 39 and 41. Where the nickel-kieselguhr used for hydrogenation of a polymer of the type previously described is recovered by means of this separator it can be returned to the hydrogenation operation, following regeneration if necessary.

Multiple separation steps are often necessary when removing the nickel-kieselguhr catalyst from hydrogenated polymers of conjugated dienes, such materials presenting an especially difficult separation problem. Since the presence of nickel has an adverse effect upon the properties of the material on aging, the removal should be such that the dried polymer contains no more than 0.10 per cent nickel by weight, preferably less than 0.05 weight per cent nickel. The removal of hydrogenation catalysts from hydrogenated cottonseed oil can be carried out using this apparatus but such a separation does not present the problems that are encountered with the hydrogenated polymer of conjugated dienes.

It is frequently desirable to operate this separator at elevated temperatures and to preheat the solution prior to its introduction into the separator. This is most conveniently done by placing a preheater (not shown) in line 31 and heating the balance of the separation apparatus by suitable means. The temperature required is dependent upon the characteristics of the solution containing the magnetizable particles. For instance, a 5 per cent by weight solution of hydrogenated polybutadiene in methylcyclohexane has a viscosity of approximately 2000 centipoises at about 80° F. and this drops to about 200 centipoises when the temperature is raised 10° F. It is preferable to operate above this gel point and, in this case, above 130° F.

As many possible embodiments may be made of this invention without departing from the spirit and scope thereof, it is to be understood that all matter herein set forth or shown in the accompanying drawing is to be interpreted as illustrative and not as unduly limiting my invention.

I claim:

1. A separator for removing magnetizable particles from a liquid comprising, a magnet; a cylinder rotatable between the pole faces of said magnet, the pole faces of said magnet enclosing a considerable portion of the outer circular surface of said cylinder; walls of non-magnetic material extending between the pole faces and enclosing the balance of the outer circular surface of said cylinder; means to prevent loss of liquid from the space defined by said cylinder, said pole faces, and said walls; means to rotate said cylinder; means to supply liquid material to and to remove it from the space between said rotatable cylinder and each of said pole faces; and means to remove material from the spaces defined and said rotatable cylinder and said walls of non-magnetic material.

2. A separator for removing magnetizable particles from a liquid comprising, a magnet; a cylinder rotatable between the pole faces of said magnet, the pole faces of said magnet enclosing a considerable portion of the outer circular surface of said cylinder; walls of non-magnetic material extending between the pole faces and enclosing the balance of the outer circular surface of said cylinder; means to prevent loss of liquid from the space defined by said cylinder, said pole faces, and said walls; means to rotate said cylinder; a first conduit extending to a space between the surface of said cylinder and a first pole face of said magnet near the up-stream side of said pole face with respect to the rotation of said cylinder; a second conduit extending from the space between said cylinder and said first pole face at the point near the down-stream edge of said first pole face; a third conduit extending to the space between said cylinder and the second pole face at a point near the up-stream side of said second pole face; a fourth conduit extending from the space between said cylinder and said second pole face at a point near the down-stream end of said second pole face; conduits extending from the space between said rotating cylinder and said non-magnetic walls; and scrapers adapted to direct material from said space between said cylinder and said non-magnetic walls into said last mentioned conduits.

3. The separator of claim 2 in which said first, second, third and fourth conduits extend through the respective pole faces.

4. The separator of claim 2 in which each pole face extends around the outer surface of said rotatable cylinder for a distance defined by an arc of 45 to 135 degrees.

5. The separator of claim 2 in which said rotatable cylinder contains 30 to 60 circumferential grooves per inch said grooves being cut at an angle of 75 to 100 degrees.

6. A separator for removing magnetizable particles from a liquid comprising, a magnet; a cylinder rotatable between the pole faces of said magnet, the pole faces of said magnet enclosing a considerable portion of the outer circular surface of said cylinder; walls of non-magnetic material extending between the pole face and enclosing the balance of the outer circular surface of said cylinder; means to prevent loss of liquid from the space defined by said cylinder, said pole faces, and said walls; means to rotate said cylinder; a first conduit extending to the space between the surface of said cylinder and a first pole face of said magnet near the up-stream side of said pole face with respect to the rotation of said cylinder; a second conduit extending from the space between said cylinder and said first pole face at a point near the down-stream edge of said first pole face to the space between said cylinder and the second pole face at a point near the up-stream side of second pole face; a third conduit extending from the space between said cylinder and said second pole face at a point near the down-stream end of said second pole face; conduits extending from the space between said rotating cylinder and said non-magnetic walls; and scrapers adapted to direct material from said space between said cylinder and said non-magnetic walls into said last mentioned conduits.

References Cited in the file of this patent

UNITED STATES PATENTS

| | | |
|---|---|---|
| 2,188,517 | Payne | Jan. 30, 1940 |
| 2,660,308 | Fischer | Nov. 24, 1953 |